United States Patent

Shiell et al.

[11] Patent Number: 5,954,812
[45] Date of Patent: Sep. 21, 1999

[54] APPARATUS FOR CACHING SYSTEM MANAGEMENT MEMORY IN A COMPUTER HAVING A SYSTEM MANAGEMENT MODE EMPLOYING ADDRESS TRANSLATION

[75] Inventors: Jonathan H. Shiell; Patrick W. Bosshart, both of Plano, Tex.

[73] Assignee: Texas Instruments Incorporated, Dallas, Tex.

[21] Appl. No.: 08/959,258

[22] Filed: Oct. 29, 1997

[51] Int. Cl.⁶ ................................... G06F 15/00
[52] U.S. Cl. ................ 712/39; 711/154; 711/145; 712/43
[58] Field of Search ................. 711/144, 145, 711/156, 141, 118, 153, 129, 154, 202; 395/800.39; 712/40, 39, 43

[56] References Cited

U.S. PATENT DOCUMENTS

| | | | |
|---|---|---|---|
| 5,475,829 | 12/1995 | Thome | 711/152 |
| 5,544,344 | 8/1996 | Frame | 395/471 |
| 5,603,004 | 2/1997 | Kurpanek et al. | 711/118 |
| 5,630,087 | 5/1997 | Talluri et al. | 711/202 |
| 5,638,532 | 6/1997 | Frame et al. | 711/154 |
| 5,764,999 | 6/1998 | Wilcox et al. | 395/734 |

*Primary Examiner*—Larry D. Donaghue
*Attorney, Agent, or Firm*—Robert D. Marshall, Jr.; Gerald E. Laws; Richard L. Donaldson

[57] ABSTRACT

A microprocessor has an internal cache memory which can cache a mix of normal system memory and system management mode memory. An address translator passes an address unchanged if a system management mode input signal indicates the normal mode. The address translator translates the address to an address range outside a range of addresses occupied by the external memory when in the system management mode. A cache memory is connected to the address translator for caching data with address tags corresponding to an address received from the address translator. The address translator preferably includes an address range comparator comparing the address with a predetermined address range. The address translation may be combined with virtual memory to physical memory address translation. An inverse address translator handles cache line writeback. The inverse address translator includes an inverse address comparator comparing the translated address with the translated address range which generates a match signal for the external system when the cache line writeback address is within the translated address range. The microprocessor may include multiple levels of cache memory with the caches closer to the processor core flushed upon entry into and exit from the system management mode. Address translation and inverse address translation is used for transfers from a unified level two cache and a level one data cache or a level one code cache.

46 Claims, 6 Drawing Sheets

APPARATUS FOR CACHING SYSTEM MANAGEMENT MEMORY IN A COMPUTER HAVING A SYSTEM MANAGEMENT MODE EMPLOYING ADDRESS TRANSLATION

TECHNICAL FIELD OF THE INVENTION

The technical field of this invention is a computer systems that uses system management mode and a microprocessor with internal cache memory.

BACKGROUND OF THE INVENTION

Computer systems employing the SL enhanced 80486 microprocessor manufactured by Intel and successor microprocessors in the x86 family enable a system management mode (SMM) of operation. The SMM can be used by system firmware to control product specific hardware features in a manner that is transparent to the computer operating system and applications programs. The SMM management mode is typically used for system management information such as the system configuration, or the configuration of a powered down microprocessor or to invoke power saving features such as a zero volt suspend function.

The SMM is subject to inefficiencies in computers employing DOS or Windows operation systems. When operating in SMM the microprocessor accesses a dedicated and separate memory called the system management random access memory (SMRAM). The SMRAM can be implemented in two ways. First, the SMRAM can occupy an area of memory having a unique addressable locations. This is known as non-overlayed memory. If this implementation of SMRAM is employed, then the microprocessor may employ internal cache memory to store data and instructions from the SMRAM. In DOS compatible systems the first 1 megabyte of memory, corresponding to the 20 bit address of the Intel 8086, is mapped according to software compatibility requirements which are a legacy of the selections made in the original IBM personal computer. Thus non-overlayed SMRAM must be located beyond the first 1 megabyte of memory. This results in computer architecture restrictions associated with this memory space higher than 1 megabyte. For example, far jumps are restricted and the program code size is limited to 64 kilobyte segments. Due to these restrictions, non-overlayed SMRAM is not often employed.

The second SMRAM implementation is more commonly used in personal computers. The SMRAM is addressed in a second, separate address space which overlaps an area of system memory within the first one megabyte of memory. Note that the legacy software restrictions require that the SMRAM overlay some portion of normal memory which is generally used for another purpose when not in SMM. When the processor is in normal mode, the external memory system accesses the system memory normally. When the processor is in SMM, the external memory system remaps the memory accesses to a separate system management memory having addresses within the system memory. The microprocessor is unaware of this external memory remapping.

This causes a problem in using the internal cache memory of the microprocessor. Because the microprocessor takes no part in the memory remapping, it cannot differentiate between normal system memory and SMRAM. Thus cache coherency cannot be maintained when using both the normal mode and the SMM. This may be avoided by treating the SMRAM as non-cachable. Of course this negates the value of the microprocessor internal cache. Current microprocessors often operate at higher instruction rates than the system bus rate. Thus the microprocessor operates much slower if the cache cannot be used. This cache coherency problem may also be avoided by cache flushing upon entry into and exit from SMM. A cache flush invalidates entries not changed since being recalled from external memory and writes back to memory dirty entries, i.e. cache entries that have been changed since being recalled from external memory. With the trend toward larger and larger internal caches, such a cache flush may take a long time. Further, a larger cache is less likely to require all prior cache entries be cleared in order to service the SMM program instruction fetches and data loads, thus many cache entries may be flushed unnecessarily. Both the alternatives make ineffective use of the internal cache of the microprocessor. At the same time, there is a trend toward greater and greater use of SMM applications. This means that the ineffective use of internal cache is becoming more critical.

A solution enabling caching of system management memory is described in U.S. Pat. No. 5,544,344 APPARATUS FOR CACHING SMRAM IN AN INTEL PROCESSOR BASED COMPUTER SYSTEM EMPLOYING SYSTEM MANAGEMENT MODE. This patent proposes using a SMIACT bit, which indicates whether the microprocessor is in normal mode or in system management mode, in a manner as a most significant address bit. Thus if the SMIACT bit is "0" indicating normal mode, data and instructions are cached normally. If the SMIACT bit is "1" indicating system management mode, this bit selects another memory space. This patent also teaches checking the address against an address range assigned to the SMRAM on every cache access. Thus data and instructions within the system management memory may be cached along side data and instructions from normal memory.

This solution has a disadvantage. This solution requires that the number of bits in the cache tag table be extended one additional bit to cover the SMIACT bit effectively used as the most significant bit of the address. Thus each cache line requires an additional tag bit. With the trend toward larger and larger internal caches, the extra area required for these additional cache tag bits becomes significant.

SUMMARY OF THE INVENTION

This invention is a microprocessor with an internal cache memory which can cache a mix normal system memory and system management mode memory. An address translator receives input addresses. The address translator passes the address unchanged if a system management mode input signal indicates the normal mode. The address translator translates the address to an address range outside a range of addresses occupied by the external memory if the system management mode input signal indicates the system management mode. A cache memory is connected to the address translator for caching data received from a data port with address tags corresponding to an address received from the address translator. The address translator may receive addresses from the external memory on memory reads, from a load/store unit that generates load address of data to be read from the external memory or store addresses of data to be written to the external memory and an instruction fetch unit that generates an instruction fetch address of an instruction to be read from the external memory. These address sources are selected by an address multiplexer.

The address translator preferably includes an address range comparator comparing the address with a predetermined address range. The address range comparator generates a match signal indicating whether the address is within the predetermined address range. This match signal is ANDed with a system management mode signal received from the external system. The translated address may be formed by multiplexing most significant bits from a translate address with the received address, XORing the AND gate output with selected bits of the received address, ORing the AND gate output with selected bits of the received address, ORing a translate address with the received address or XORing a translate address with the received address. The address range and the translate address may be either fixed upon manufacture of the microprocessor or writable during operation. The address translation may be combined with virtual memory to physical memory address translation.

The microprocessor preferably also includes an inverse address translator for cache line writeback. The inverse address translator includes an inverse address comparator comparing the translated address with the translated address range. The inverse address translator passes the cache line writeback address unchanged if the cache line writeback address is not within the translated address range. The inverse address translator translates the cache line writeback address to the predetermined address range if the cache line writeback address is within the translated address range. The inverse address translator generates a match signal for supply to the external memory and peripherals indicating a system management mode when the cache line writeback address is within the translated address range. The inverse address translator may be constructed in a fashion similar to the address translator.

The microprocessor may include multiple levels of cache memory. If the cache memory previously described is a unified level two cache, then a level one data cache may be used. The level one data cache is flushed upon entry into and exit from the system management mode. Thus this cache may include untranslated addresses because normal memory and system management memory are never simultaneously cached in this data cache. A secondary address translator similar to the original address translator handles addresses for cache line writeback into the level two cache memory. A secondary inverse address translator handles the addresses for a cache line fills into the level one data cache memory. A similar technique is usable for a level one code cache memory. A secondary address translator is not needed between the level two cache memory and the level one code cache memory if self-modifying code is prohibited.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
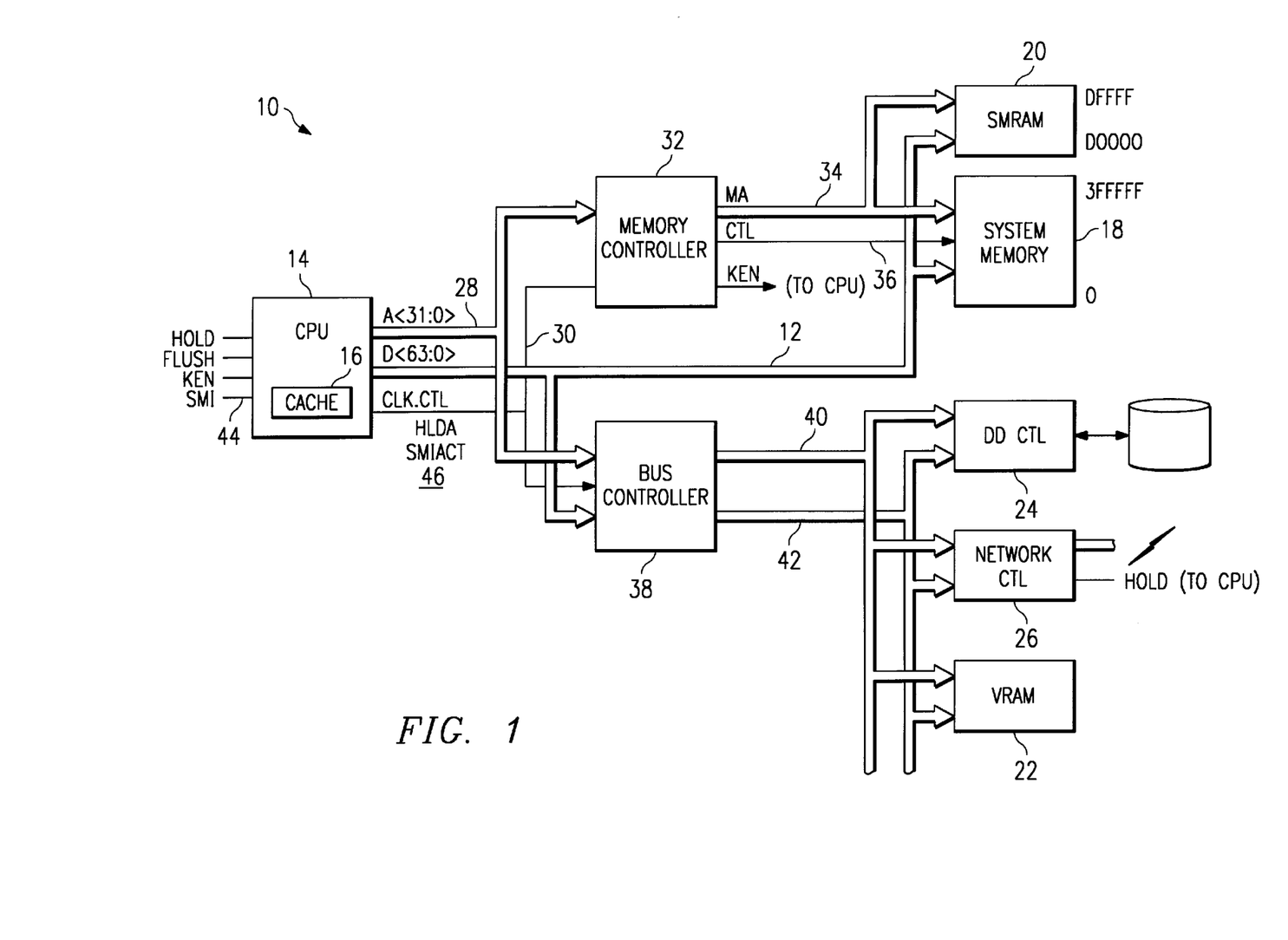
FIG. 1 is a block diagram of a computer system supporting system management mode illustrating I/O devices, normal system memory and system management memory.

FIG. 1 is a block diagram of a personal computer system 10 of the type to this invention applies. Computer system 10 enables bus translations via system data bus 12 between a central processing unit (CPU) 14, which includes an internal cache 16, and a system memory 18, SMRAM 20, video memory (VRAM) 22 and various input/output (I/O) peripheral devices such as disk drive controller (DD CTL) 24 and network controller 26. Central processing unit 14 is coupled via system address bus 28 and CPU control bus 30 to memory controller 32, which is coupled to system memory 18 and SMRAM 20. Memory controller 32 supplies memory address bus 34 and memory control signals 36 to system memory 18 and SMRAM 20. This enables data transfer between system memory 18 or SMRAM 20 and central processing unit 14 via system data bus 12. Central processing unit 14 is coupled via system data bus 12, system address bus 28 and CPU control bus 30 to bus controller 38. Bus controller 38 is coupled via buffered address bus 40 and buffered data bus 42 to video memory 22, network controller 26 and disk drive controller 24 and any other peripheral devices. Computer system 10 may be a desk top personal computer, a portable notebook computer, a network server and may or may not include all the devices illustrated in FIG. 1.

In the preferred embodiment central processor 14 is an SL enhanced 80486 microprocessor manufactured by Intel or a successor microprocessor in the x86 family. This family of microprocessors employ a system management mode (SMM). Unique to the system management mode is dedicated interrupt line SMI 44 and memory space SMRAM 20. The SMM is typically used to implement intelligent power management and other enhanced system functions from SMRAM 20 transparently to the operating system and applications programs.

Assertion of a system management interrupt (SMI) via an SMI signal on interrupt line 44 invokes the system management mode in central processing unit 14. Central processing unit 14 responds by asserting a system management interrupt acknowledge SMIACT signal on line 46, a part of CPU control bus 30. Memory controller 32 then permits central processing unit 14 to access SMRAM 20. The SMRAM 20 is dedicated and secured for SMM only, the operating system and applications programs cannot access SMRAM 20. The current state of central processing unit 14 (i.e. the context) is stored in SMRAM 20 after assertion of the SMIACT signal. Central processing unit 14 then jumps to a location within SMRAM 20 to execute the SMI handler code enabling the system management functions. Upon completion of the system management functions, the SMI handler executes a resume (RSM) instruction that restores the context of central processing unit 14 from SMRAM 20, de-assert the SMIACT signal and then returns control to the previously interrupted operating system or applications program function.

Addresses asserted on address bus 28 by central processing unit 14 are know as "system" addresses. These addresses will be denominated in hexidecimal format denoted by an "H" suffix. The thirty two bits of address A(31:0) of address bus 28 can access $2^{32}$ or 4 Gigabytes of memory. The SMRAM 20 may be located anywhere within this system address space. The program instructions located within the first 1 megabyte of memory, including addresses from 0 H to F FFFF H. has greater flexibility than program instruction located at addresses greater than 1 Megabyte, above address 10 0000 H. Instructions residing above the first 1 Megabyte are restricted from using far jumps to access outside the current segment. This restriction is particularly limiting to instruction code which calls the system basic input/output system (BIOS), which resides in the first 1 Megabyte. Thus when executing SMM instructions with require BIOS calls, it is desirable to execute the instructions from the first 1 Megabyte of address space.

Figure 2:
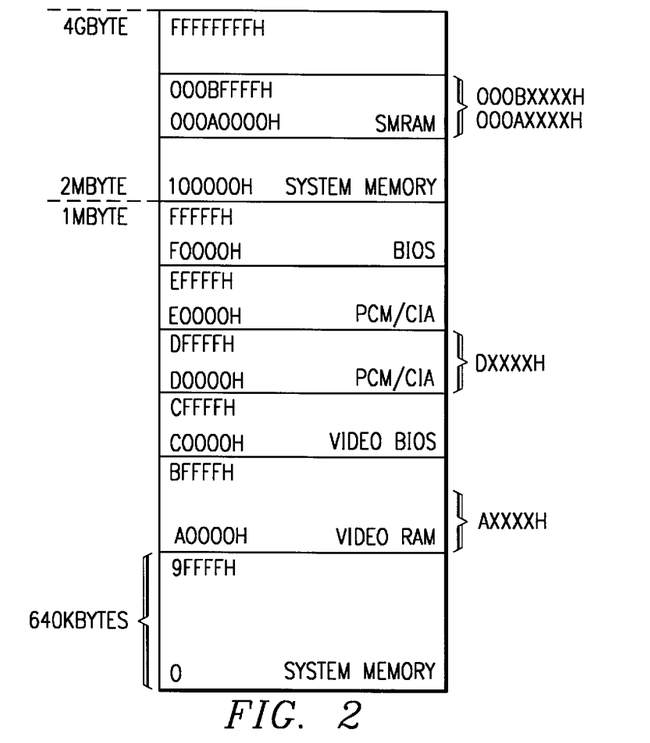
FIG. 2 is a system memory address map for a representative computer system such as illustrated in FIG. 1.

FIG. 2 illustrates a partial memory mapping of the system memory of computer 10. This memory mapping is typical of computers compatible with the MS-DOS operating system. The lowest 640 Kilobytes of system address space, addresses from 0 H to 9 FFFF H, map to system memory 18. This portion of the address space is available to the operating system and DOS applications programs. System addresses from A 0000 H to B FFFF H map to video memory 22. System addresses from C 0000 H to C FFFF H map to the video BIOS code. System addresses D 0000 H to D FFFF H and E 0000 H to E FFFF H are often mapped to separate PCMCIA peripheral areas, respectively, or may be mapped to other peripheral devices. System addresses F 0000 H to F FFFF H are reserved for BIOS code. System addressed above 10 0000 H, above 1 Megabyte, are mapped to system memory for application program use. The SMRAM often includes 64 to 128 Kilobytes and, as shown in FIG. 2, is often mapped to system addresses A 0000 H to B FFFF H.

FIG. 2 shows that the lower 1 Megabyte of the system address space in a typical personal computer system is already fully mapped for software compatibility. Thus in order to execute system management instructions from the first 1 Megabyte of system address space, SMRAM 20 must be "overlayed" with regular system memory 18. That is, both SMRAM 20 and system memory 18 are accessed with a single range of addresses. Thus the physical memory accessed is dependent upon whether computer system 10 is in normal mode or system management mode. As an example SMRAM 20 may be mapped to reside at system addresses D 0000 H to D FFFF H. When operating in normal mode, an access to system address D 0000 H by central processing unit 14 is directed by memory controller 32 to system memory 18 at address D 0000 H. When operating in system management mode, an access to system address D 0000 H by central processing unit 14 is directed by memory controller 32 to SMRAM 20, wherever SMRAM 20 is physically located. Memory controller 38 monitors address bus 28 and the state of the SMIACT signal to properly direct the access requests of central processing unit 14 to memory locations within the range from D 0000 H to D FFFF H.

As previously described, prior art overlayed SMRAM implementations cause cache coherency problems. Central processing unit 14 and its internal cache 16 cannot differentiate between system memory 18 and SMRAM 20 for a given address. The prior art solution to this problem of cache coherency is to treat the SMRAM as non-cachable. This course this negates the value of internal cache 16 when performing system management functions.

In accordance with this invention, the addresses of the SMRAM are translated into an unused portion of real memory. The thirty two bits of address A(31:0) of address bus 28 can access $2^{32}$ or 4 Gigabytes of memory. Current personal computers include much less actual memory. It is very unusual for a personal computer to have 128 Megabytes of memory. Thus there are generally large addressable areas currently unused. The internal address busses of the microprocessor generally include all 32 address bits. Accordingly, the internal cache will typically have the capacity to handle addresses where there will be no real memory.

Figure 3:
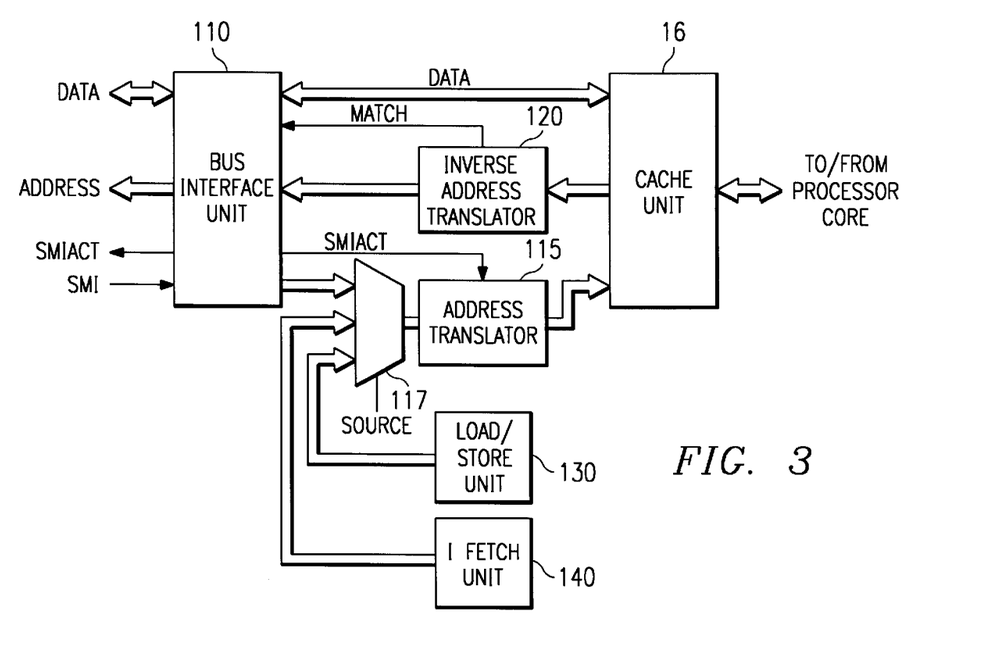
FIG. 3 is a block diagram of the address translation technique for caching system management memory according to this invention.

FIG. 3 illustrates one example of the inventive technique in block diagram form. FIG. 3 illustrates only features included within CPU 14 of FIG. 1. The external system illustrated in FIG. 1 is unchanged. FIG. 3 shows bus interface unit 110 connected to data lines D(63:0) 12, address lines A(31:0) 28, SMIACT line 30 and SMI line 44. Bus interface unit 110 exchange data with cache unit 16. Note also that FIG. 3 does not illustrate the data supply from cache unit 16 to the core of microprocessor 14. This connection is conventional and is not illustrated for brevity.

Bus interface unit 110 supplies an address to cache unit 16 via multiplexer 117 and address translator 115 for writes into cache unit 16 for cache fills. If selected by multiplexer 117, the address is supplied to address translator 115. Address translator 115 is enabled by the SMIACT signal. If microprocessor 14 is in normal mode, address translator 115 is turned off. Thus the address passes through address translator 115 unchanged. Accordingly, cache unit 16 is addressed normally. Similarly, if selected by multiplexer 117 and microprocessor 14 is in normal mode, the data address from load/store unit 130 passes to cache unit 16 normally. Likewise, the instruction address from instruction fetch unit 140 (I Fetch) when selected by multiplexer 117 passes through address translator 115 unchanged when microprocessor 14 is in normal mode.

When microprocessor 14 is in SMM, the SMIACT signal is active. This enables address translator 115. Address translator 115 checks the address from the source selected by multiplexer 117. If this address is within the range of addresses assigned to SMRAM, then address translator 115 translates the address to a unused portion of memory. This would typically be an address greater than 128 Megabytes (07FF FFFF Hex), which will not generally be used for real memory. If this address is not within the range assigned to SMM, then address translator passes the address unchanged. Accordingly, cache unit 16 may store both data in the normal mode and data in the system management mode without interference.

Figure 4:
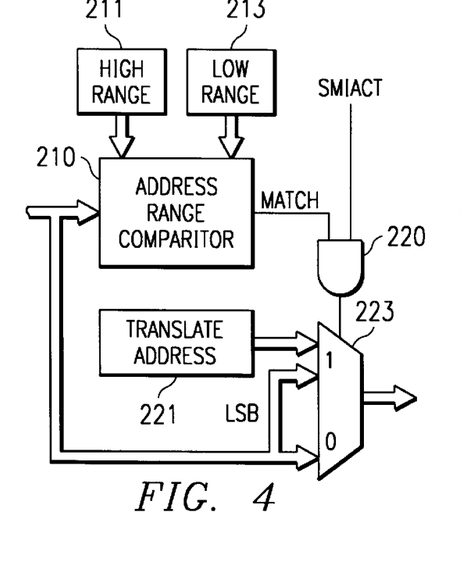
FIG. 4 is a block diagram of a first example of the address translator illustrated in FIG. 3.

FIGS. 4 to 8 illustrates various embodiments of address translator 115. FIG. 4 illustrates the substitution of a number of most significant bits during address translation. The incoming address is supplied to address range comparator 210. Address range comparator 210 compares the received address with the addresses stored in high range register 211 and low range register 213. High range register 211 stores the highest address assigned to SMRAM, preferably 000B FFFF Hex. Low range register 213 stores the lowest address assigned to SMRAM, preferably 000A 0000 Hex. Address range comparator 210 generates a match signal if the received address is within the address range encompassed by high range register 211 and low range register 213. This match signal forms one input to AND gate 220. The other input of AND gate 220 receives the SMIACT signal. The output of AND gate 220 controls the data selected by multiplexer 223. The output of AND gate 220 is "0" when either there is no address match or microprocessor 14 is not in SMM. In this state, multiplexer 223 selects the input address signal for output. Thus address translator 115 passes the address unchanged. The output of AND gate 220 is "1", when there is both an address range match and microprocessor 14 is in SMM. In this state, multiplexer 223 selects a set of most significant bits stored in translate address register 221 and a set of least significant bits from the input address. In order to prevent address aliasing, the most significant bits stored in translate address register 221 are at places where the SMRAM address is "0". Thus translate address register 221 preferably includes the most significant bits 27 to 31. All of these addresses need not be "1", but placing a "1" in any of these address would remap the SMRAM address to beyond 128 Megabytes. This would be beyond any addresses used by real memory.

Figure 5:
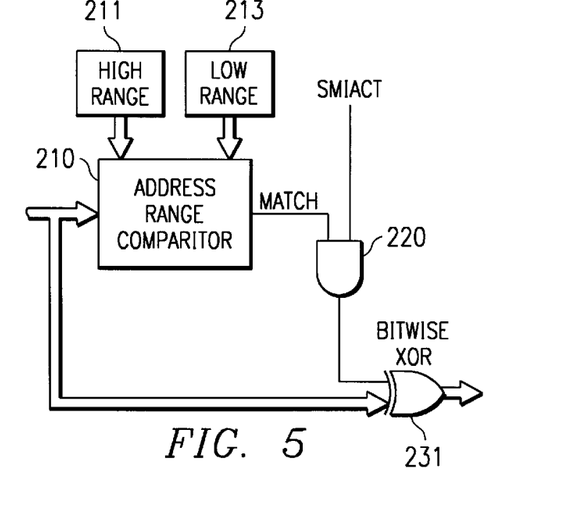
FIG. 5 is a block diagram of a second example of the address translator illustrated in FIG. 3.

FIG. 5 illustrates an alternative embodiment of address translator 115. This alternative embodiment includes address range comparator 210, high range register 211, low range register 213 and AND gate 220 as illustrated in FIG. 4. When a match is detected and when in SMM, AND gate 220 supplies "1" to one or more bits of bit-wise XOR gate 231. This preferably includes at least one bit in the range of bits 27 to 31 to ensure the translated address is above 128 Megabytes. Bit-wise XOR 231 changes the SMRAM address to another address within the address space not occupied by real memory.

Figure 6:
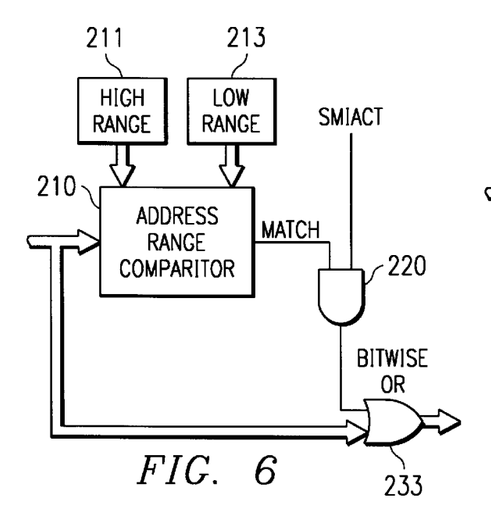
FIG. 6 is a block diagram of a third example of the address translator illustrated in FIG. 3.

The embodiment of address translator 115 illustrated in FIG. 6 is substantially similar to that illustrated in FIG. 5. In FIG. 6, bit-wise XOR 231 is replaced by bit-wise OR 233. Bit-wise OR 233 generates the translated address for supply to cache unit 16. If the bits receiving the "1" in FIG. 6 are at most significant bits greater than used by real memory, then the address translator 115 of FIG. 6 generates an identical address as the address translator 115 of FIG. 5.

Figure 7:
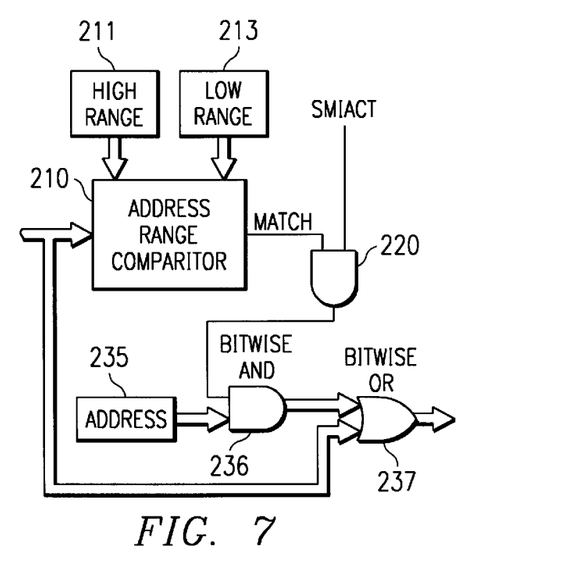
FIG. 7 is a block diagram of a fourth example of the address translator illustrated in FIG. 3.
Figure 8:
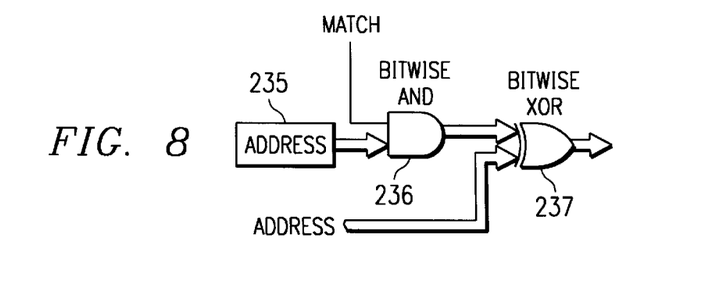
FIG. 8 is block diagram of a part of the address translator illustrated in FIG. 7 modified in accordance with a fifth example.
Figure 9:
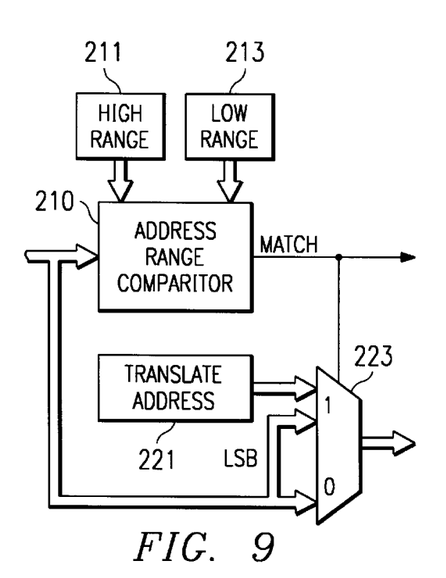
FIG. 9 is a block diagram of a first example of the inverse address translator illustrated in FIG. 3.
Figure 10:
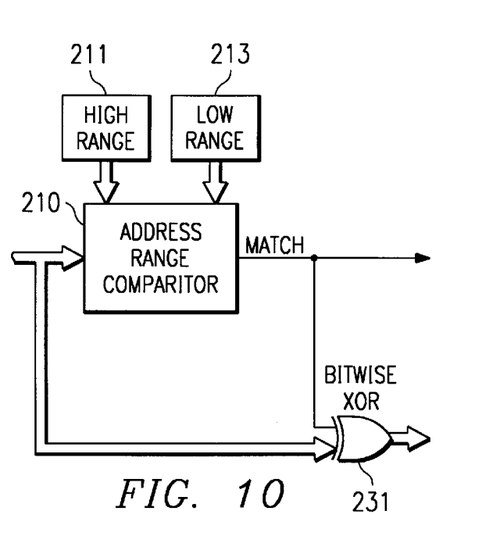
FIG. 10 is a block diagram of a second example of the inverse address translator illustrated in FIG. 3.
Figure 11:
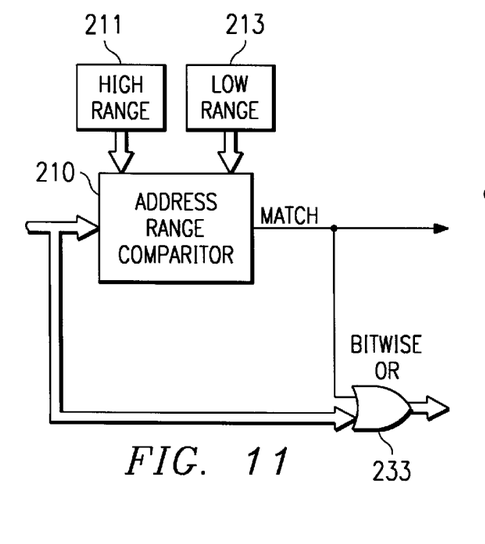
FIG. 11 is a block diagram of a third example of the inverse address translator illustrated in FIG. 3.
Figure 12:
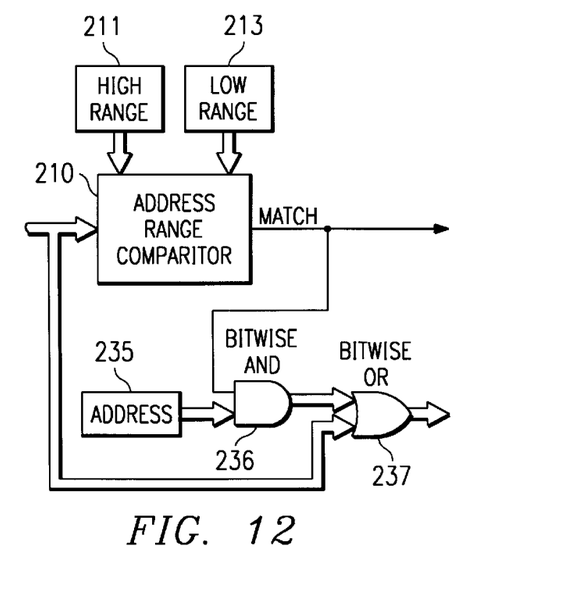
FIG. 12 is a block diagram of a fourth example of the inverse address translator illustrated in FIG. 3.

FIGS. 7 and 8 illustrate further alternative embodiments of address translator 115. FIG. 7 illustrates address range comparator 210, high range register 211, low range register 213 and AND gate 220 as illustrated in FIG. 4. When a match is detected and when in SMM, AND gate 220 supplies "1" to each bit of bit-wise AND gate 236. Passes the address stored within address register 235 to bit-wise OR 237. This address register 235 preferably includes at least one "1" bit in the range of bits 27 to 31 to ensure the translated address is above 128 Megabytes. Bit-wise OR 237 changes the SMRAM address to another address within the address space not occupied by real memory. As shown in the partial illustration of FIG. 8, bit-wise OR gate 237 may be replaced by bit-wise XOR gate 239.

Referring back to FIG. 3, there are times when data stored within cache unit 16 must pass through bus interface unit 110 to the memory system. This occurs when a dirty cache line, i.e. a cache line containing data that has been changed since recalled from external memory, must be replaced to make room for new data or instructions. Note that this writeback cache line may have originated from system memory or from SMRAM. This address generated by cache unit 16 is supplied to inverse address translator 120. Inverse address translator 120 performs the inverse of the address translation of address translator 115. Inverse address translator 120 detects whether the address received from cache unit 16 is within the remapped addresses assigned to SMRAM. If the address is within the remapped range of SMRAM, inverse address translator 120 reverses the address translation of address translator 115. This recovered address is supplied to bus interface unit 110 for supply to the external system. If there is no range match detected by inverse address translator 120, bus interface unit 110 must momentarily de-assert SMIACT. This will inform the external system that the write is to system memory rather than to SMRAM. Without the match signal from inverse address translator 120, bus interface unit 110 would not be able to properly signal the external system to specify the correct memory space. Note this requires that the external system be able to respond to the SMIACT output of microprocessor 14 on a cycle by cycle basis in order to support caching both system memory and SMRAM.

Inverse address translator 120 is constructed substantially the same as address translator 115. Various embodiments of inverse address translator 120 are illustrated in FIGS. 9, 10, 11 and 12. Note that inverse address translator 120 does not include AND gate 220 and is not responsive to the SMIACT signal. Instead, inverse address translator 120 outputs its MATCH signal to be used by bus interface unit 110 as outlined above. In other aspects inverse address translator 120 illustrated in FIGS. 9, 10, 11 and 12 is substantially the same as address translator 115 illustrated in FIGS. 4, 5, 6 and 7, respectively. Note that bit-wise XOR gate 239 illustrated in FIG. 8 may be substituted for bit-wise OR gate 237 illustrated in FIG. 12. This substitution was previously described with regard to FIGS. 7 and 8.

In the preferred embodiment the ranges and address translation are fixed upon manufacture of microprocessor 14. Thus high range register 211, low range register 212, translate address register 221 and address register 235 are formed of read only memory or other suitable fixed structures. This has the advantage of not requiring any change in the computer system employing microprocessor 14 to enable SMRAM caching. However, this also requires that the address range of SMRAM be the same as fixed in microprocessor 14 upon manufacture. Alternatively, one or more of high range register 211, low range register 212, translate address register 221 and address register 235 may be formed of read/write memory such as control registers. In this event, these read/write registers must be properly loaded prior to attempting to cache SMRAM. It is preferable that the system read only memory basic input/output system (ROM BIOS) include the selected data and program code to load these read/write registers. The particular ROM BIOS must be selected in conjunction with the parameters of the external memory system to insure proper correlation of address ranges. Since the original equipment manufacture of the computer system has control over all these parameters, it is feasible to match the ROM BIOS to the particular computer.

Figure 13:
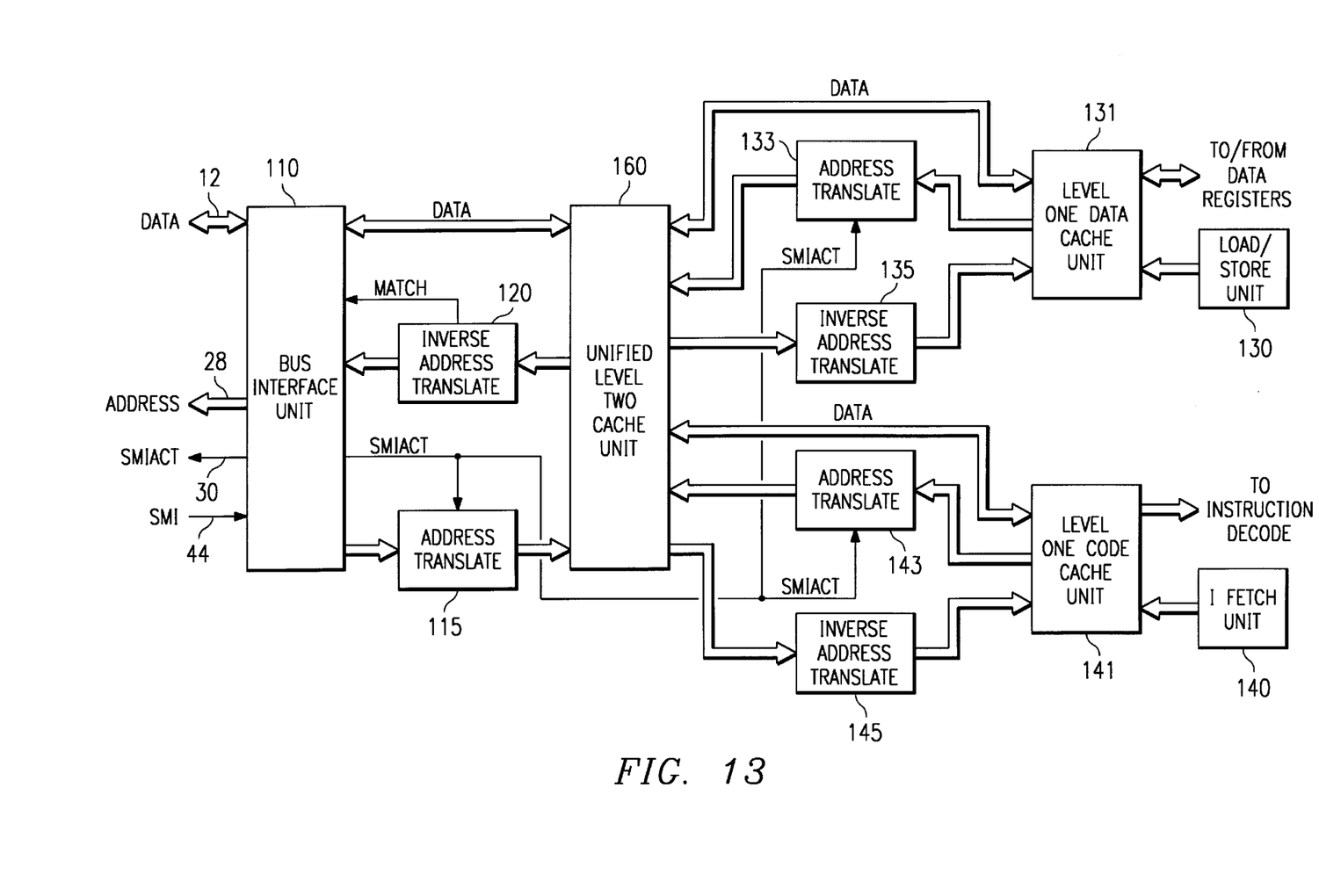
FIG. 13 is a block diagram of the address translation technique for caching system management memory according to an alternative embodiment suitable for use with multilevel caches.

FIG. 13 illustrates the use of this address translation technique in a multilevel cache system. Microprocessor 14 illustrated in FIG. 13 includes a level one data cache unit 131, a level one code cache unit 141 and a unified level two cache unit 160. The interaction between bus interface unit 110 and unified level two cache unit 160 is substantially the same as the interaction between bus interface unit 110 and cache unit 16 described in conjunction with FIG. 3. In the embodiment of FIG. 13, level one data cache unit 131 and level one code cache unit 141 do not employ translated addresses. Instead level one data cache unit 131 and level one code cache unit 141 employ the microprocessor core addresses received from load/store unit 130 and instruction fetch unit 140, respectively. In this embodiment level one data cache unit 131 and level one code cache unit 141 are substantially smaller than unified level two cache unit 160. These caches are of a size that they will probably be filled with data from SMRAM when operating in SMM. Thus there is little advantage in trying to simultaneously cache both system memory and SMRAM in these caches. Accordingly, these caches are flushed upon entry into and exit from SMM. On the other hand, unified level two cache unit 160 is preferably sufficiently large that flushing this cache upon entry into and exit from SMM would be a substantial system burden. Accordingly, SMRAM data is cached in unified level two cache unit 160 at translated addresses.

Writeback data transferred from level one data cache 131 to unified level two cache unit 160 is translated by address translator 133 in the manner previously described. Address translator 133 may be constructed according to any of the previously described embodiments illustrated in FIGS. 4, 5, 6, 7 and 8. Cache fill data transferred from unified level two cache unit 160 to level one data cache unit 131 is inverse translated via inverse address translator 135. Note that since level one data cache unit 131 will not cache both system memory and SMRAM, no address range match signal is needed to distinguish between these two memory sources. Inverse address translator 135 may be constructed according to any of the previously described embodiments illustrated in FIGS. 9, 10, 11 and 12. In a similar fashion, writeback instructions (such as from self-modifying code) transferred from level one code cache 141 to unified level two cache unit 160 is translated by address translator 143, which may be constructed according to any of the previously described embodiments illustrated in FIGS. 4, 5, 6, 7 and 8. Note that if self-modifying codes is not allowed, there would never be any "dirty" entries in level one code cache unit 141 that would need to be written back into unified level two cache unit 160. Thus there would be no need for address translator 143 and this circuit may be omitted. Cache fill data transferred from unified level two cache unit 160 to level one code cache unit 141 is inverse translated via inverse address translator 145, which may be constructed according to any of the previously described embodiments illustrated in FIGS. 9, 10, 11 and 12. Provision of small, fast caches nearer the execution portions of microprocessor 14 which are flushed upon entry into and exit from SMM and a larger but slower unified cache enable optimum use of silicon area and computation resources.

Figure 14:
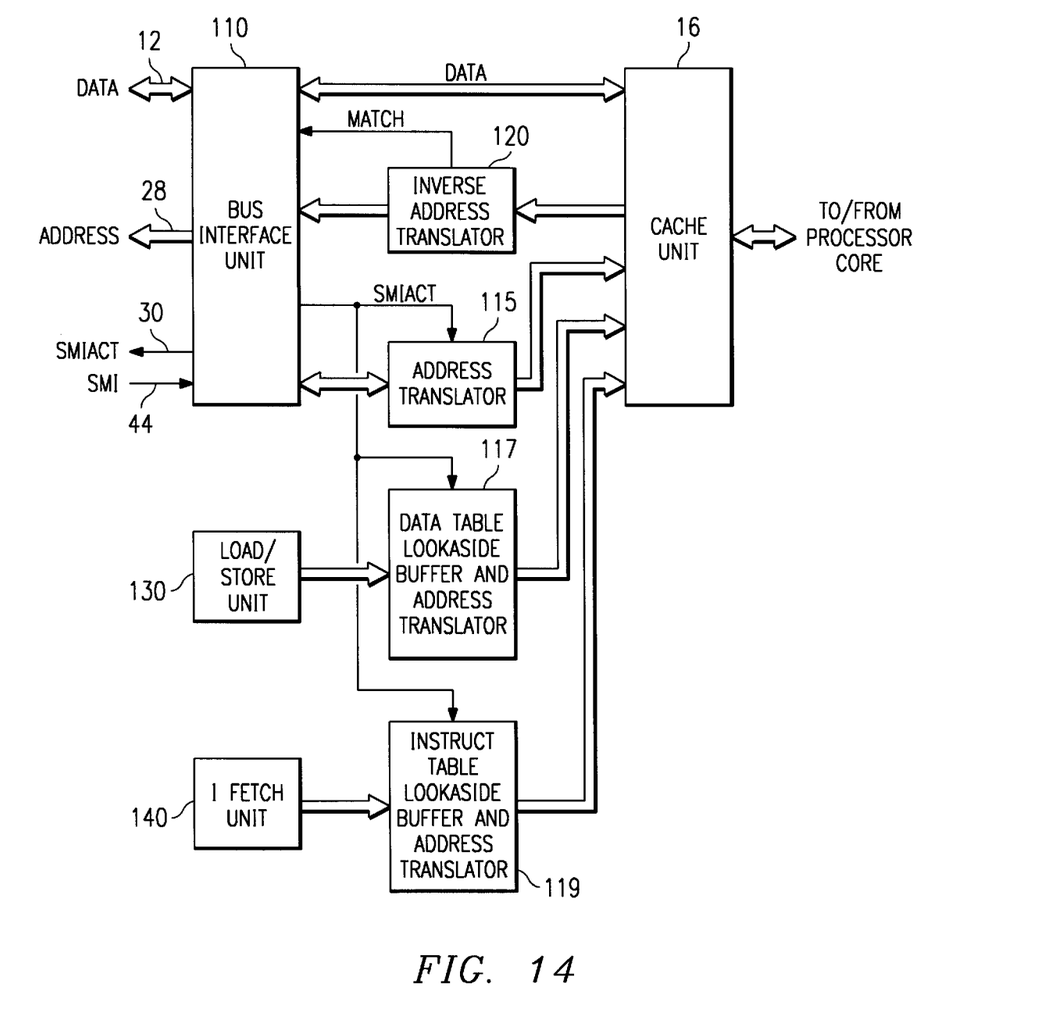
FIG. 14 is a block diagram of an alternative embodiment in which the address translation of this invention is combined with virtual address to physical address translation.

FIG. 14 illustrates an alternative embodiment in which the address translation of this invention is combined with translation from virtual address to physical address. Load/store unit 130 supplies a virtual address to data table lookaside buffer and address translator 117. Data table lookaside buffer and address translator 117 provides virtual to physical address translation in a manner known in the art. This virtual to physical address translation also includes the selective physical address translation dependent upon the microprocessor mode based upon the SMIACT signal as disclosed above. Instruction fetch unit 140 supplies a virtual address to instruction table lookaside buffer and address translator 119. Instruction table lookaside buffer and address translator 119 provides virtual to physical address translation in a manner known in the art. This virtual to physical address translation also includes the selective physical address translation dependent upon the microprocessor mode based upon the SMIACT signal as disclosed above. This combination of functions is particularly useful and easy to implement when using 4 Megabyte pages. This technique advantageously combines the functions of virtual to physical address translation and address translation of this invention.

What is claimed is:

1. A microprocessor adapted for connection to external memory and peripherals comprising:

a data port for bidirectional exchange of data with the external memory and peripherals;

an address port for supplying addresses to the external memory and peripherals;

a mode input for a system management mode input signal from the external memory and peripherals, said system management mode input signal indicating a normal mode or a system management mode;

an address translator connected to said mode input, receiving an address input, said address translator (1) passing said received address unchanged if said system management mode input signal indicates said normal mode, and (2) translating said received address to a first predetermined address range outside a range of addresses including the external memory if said system management mode input signal indicates said system management mode and said received address is within a second predetermined address range assigned to system management memory; and a cache memory connected to said data port and said address translator for storing data received from said data port therein with address tags corresponding to an address received from said address translator.

2. The microprocessor of claim 1, further comprising:

a load/store unit for generating a selected one of either a load address of data to be read from the external memory or a store address of data to be written to the external memory; and an address multiplexer connected to said load/store unit and said address translator, said address multiplexer having a first input for receiving an address corresponding to a memory access of the external memory and a second input for receiving said load address or said store address, said address multiplexer connecting a selected one of either said first input or said second input to supply said address to said address translator.

3. The microprocessor of claim 1, further comprising:

an instruction fetch unit for generating an instruction fetch address of an instruction to be read from the external memory; and an address multiplexer connected to said instruction fetch unit and said address translator, said address multiplexer having a first input for receiving an address corresponding to a memory access of the external memory and a second input for receiving said instruction fetch address, said address multiplexer connecting a selected one of either said first input or said second input to supply said address to said address translator.

4. The microprocessor of claim 1, further comprising:

a load/store unit for generating a selected one of either a load address of data to be read from the external memory or a store address of data to be written to the external memory;

an instruction fetch unit for generating an instruction fetch address of an instruction to be read from the external memory; and an address multiplexer connected to said load/store unit, said instruction fetch unit and said address translator, said address multiplexer having a first input for receiving an address corresponding to a memory access of the external memory, a second input for receiving said load address or said store address and a third input for receiving said instruction fetch address, said address multiplexer connecting a selected one of either said first input, said second input or said third input to supply said address to said address translator.

5. The microprocessor of claim 1, wherein:

said address translator includes an address range comparator for comparing said received address with said second predetermined address range and generating a match signal indicating whether said received address is within said second predetermined address range, an AND gate having a first input receiving said system management mode input signal, a second input receiving said match signal and an output, a translate address register having a predetermined set of most significant address bits stored therein, an address translator multiplexer having a first input receiving said received address and a second input receiving said translate address register and a set of least significant bits of said received address, said address translator connected to said output of said AND gate for (1) connecting said first input to said cache memory if either said system management mode signal indicates said normal mode or said match signal indicates said received address is not within said second predetermined address range, or (2) connecting said second input to said cache memory if both said system management mode signal indicates said system management mode and said match signal indicates said received address is within said second predetermined address range.

6. The microprocessor of claim 5, wherein:

said address translator wherein said second predetermined address range and said translate address register are fixed upon manufacture of said microprocessor.

7. The microprocessor of claim 5, wherein:

said address translator includes a high range register for storing an upper address boundary of said second predetermined address range, said high range register writable during operation of the microprocessor, a low range register for storing a lower address boundary of said second predetermined address range, said low range register writable during operation of the microprocessor, and said translate address register is writable during operation of the microprocessor.

8. The microprocessor of claim 1, wherein:

said address translator includes an address range comparator for comparing said received address with said second predetermined address range and generating a match signal indicating whether said received address is within said second predetermined address range, an AND gate having a first input receiving said system management mode input signal, a second input receiving said match signal and an output, a bit-wise exclusive OR gate having a first input receiving said received address, a second input receiving said output of said AND gate at a predetermined set of bits, and an output connecting to said cache memory.

9. The microprocessor of claim 8, wherein:

said address translator wherein said second predetermined address range is fixed upon manufacture of said microprocessor.

10. The microprocessor of claim 8, wherein:

said address translator includes a high range register for storing an upper address boundary of said second predetermined address range, said high range register writable during operation of the microprocessor, and a low range register for storing a lower address boundary of said second predetermined address range, said low range register writable during operation of the microprocessor.

11. The microprocessor of claim 1, wherein:

said address translator includes an address range comparator for comparing said received address with said second predetermined address range and generating a match signal indicating whether said received address is within said second predetermined address range, an AND gate having a first input receiving said system management mode input signal, a second input receiving said match signal and an output, a bit-wise OR gate having a first input receiving said received address, a second input receiving said output of said AND gate at a predetermined set of bits, and an output connecting to said cache memory.

12. The microprocessor of claim 11, wherein:

said address translator wherein said second predetermined address range is fixed upon manufacture of said microprocessor.

13. The microprocessor of claim 11, wherein:

said address translator includes a high range register for storing an upper address boundary of said second predetermined address range, said high range register writable during operation of the microprocessor, and a low range register for storing a lower address boundary of said second predetermined address range, said low range register writable during operation of the microprocessor.

14. The microprocessor of claim 1, wherein:

said address translator includes an address range comparator for comparing said received address with said second predetermined address range and generating a match signal indicating whether said received address is within said second predetermined address range, an AND gate having a first input receiving said system management mode input signal, a second input receiving said match signal and an output, a translate address register having a predetermined set of address bits stored therein, a bit-wise AND gate having a first input receiving at each bit said output of said AND gate, a second input receiving said translate address register and an output a bit-wise OR gate having a first input receiving said received address, a second input receiving said output of said bit-wise AND gate, and an output connecting to said cache memory.

15. The microprocessor of claim 14, wherein:

said address translator wherein said second predetermined address range and said translate address register are fixed upon manufacture of said microprocessor.

16. The microprocessor of claim 14, wherein:

said address translator includes
- a high range register for storing an upper address boundary of said second predetermined address range, said high range register writable during operation of the microprocessor,
- a low range register for storing a lower address boundary of said second predetermined address range, said low range register writable during operation of the microprocessor, and
- said translate address register is writable during operation of the microprocessor.

17. The microprocessor of claim 1, wherein:

said address translator includes
- an address range comparator for comparing said received address with said second predetermined address range and generating a match signal indicating whether said received address is within said second predetermined address range,
- an AND gate having a first input receiving said system management mode input signal, a second input receiving said match signal and an output,
- a translate address register having a predetermined set of address bits stored therein,
- a bit-wise AND gate having a first input receiving at each bit said output of said AND gate, a second input receiving said translate address register and an output
- a bit-wise exclusive OR gate having a first input receiving said received address, a second input receiving said output of said bit-wise AND gate, and an output connecting to said cache memory.

18. The microprocessor of claim 17, wherein:

said address translator wherein said second predetermined address range and said translate address register are fixed upon manufacture of said microprocessor.

19. The microprocessor of claim 17, wherein:

said address translator includes
- a high range register for storing an upper address boundary of said second predetermined address range, said high range register writable during operation of the microprocessor,
- a low range register for storing a lower address boundary of said second predetermined address range, said low range register writable during operation of the microprocessor, and
- said translate address register is writable during operation of the microprocessor.

20. The microprocessor of claim 1, further comprising:
- an inverse address translator receiving a cache line writeback address output from said cache memory upon cache line writeback, said inverse address translator (1) passing said cache line writeback address unchanged if said cache line writeback address is not within said first predetermined address range outside a range of addresses including the external memory, and (2) translating said cache line writeback address to said second predetermined address range assigned to system management memory if said cache line writeback address is within said first predetermined address range outside a range of addresses including the external memory; and
- a mode output connected to said inverse address translator for a system management mode output signal to the external memory and peripherals, said system management mode output signal indicating a system management mode when said cache line writeback address is within said first predetermined address range outside a range of addresses including the external memory and indicating a normal mode when said cache line writeback address is not within said first predetermined address range outside a range od addresses including the external memory.

21. The microprocessor of claim 20, wherein:

said inverse address translator includes
- an inverse address range comparator for comparing said cache line writeback address with said first predetermined address range outside a range of addresses including the external memory and generating a match signal indicating whether said cache line writeback address is within said first predetermined address range,
- a translate address register having a predetermined set of most significant address bits stored therein,
- an inverse address translator multiplexer having a first input receiving said cache line writeback address and a second input receiving said translate address register and a set of least significant bits of said cache line writeback address, said inverse address translator receiving said match signal for (1) connecting said first input to said cache memory if said match signal indicates said cache line writeback address is not within said first predetermined address range, or (2) connecting said second input to said cache memory if said match signal indicates said cache line writeback address is within said first predetermined address range.

22. The microprocessor of claim 21, wherein:

said inverse address translator wherein said first predetermined address range and said translate address register are fixed upon manufacture of said microprocessor.

23. The microprocessor of claim 21, wherein:

said inverse address translator includes
- a high range register for storing an upper address boundary of said first predetermined address range, said high range register writable during operation of the microprocessor,
- a low range register for storing a lower address boundary of said first predetermined address range, said low range register writable during operation of the microprocessor, and
- said translate address register is writable during operation of the microprocessor.

24. The microprocessor of claim 20, wherein:

said inverse address translator includes
- an inverse address range comparator for comparing said cache line writeback address with said first predetermined address range outside a range of addresses including the external memory and generating a match signal indicating whether said cache line writeback address is within said first predetermined address range,
- an AND gate having a first input receiving said system management mode input signal, a second input receiving said match signal and an output,
- a bit-wise exclusive OR gate having a first input receiving said cache line writeback address, a second input receiving said output of said AND gate at a predetermined set of bits, and an output connecting to said cache memory.

25. The microprocessor of claim 24, wherein:

said inverse address translator wherein said first predetermined address range is fixed upon manufacture of said microprocessor.

26. The microprocessor of claim 24, wherein:
said inverse address translator includes
- a high range register for storing an upper address boundary of said first predetermined address range, said high range register writable during operation of the microprocessor, and
- a low range register for storing a lower address boundary of said first predetermined address range, said low range register writable during operation of the microprocessor.

27. The microprocessor of claim 20, wherein:
said inverse address translator includes
- an inverse address range comparator for comparing said cache line writeback address with said first predetermined address range outside a range of addresses including the external memory and generating a match signal indicating whether said cache line writeback address is within said first predetermined address range,
- an AND gate having a first input receiving said system management mode input signal, a second input receiving said match signal and an output,
- a bit-wise OR gate having a first input receiving said cache line writeback address, a second input receiving said output of said AND gate at a predetermined set of bits, and an output connecting to said cache memory.

28. The microprocessor of claim 27, wherein:
said inverse address translator wherein said first predetermined address range is fixed upon manufacture of said microprocessor.

29. The microprocessor of claim 27, wherein:
said inverse address translator includes
- a high range register for storing an upper address boundary of said first predetermined address range, said high range register writable during operation of the microprocessor, and
- a low range register for storing a lower address boundary of said first predetermined address range, said low range register writable during operation of the microprocessor.

30. The microprocessor of claim 20, wherein:
said inverse address translator includes
- an inverse address range comparator for comparing said cache line writeback address with said first predetermined address range outside a range of addresses including the external memory and generating a match signal indicating whether said cache line writeback address is within said first predetermined address range,
- an AND gate having a first input receiving said system management mode input signal, a second input receiving said match signal and an output,
- a translate address register having a predetermined set of address bits stored therein,
- a bit-wise AND gate having a first input receiving at each bit said output of said AND gate, a second input receiving said translate address register and an output
- a bit-wise OR gate having a first input receiving said cache line writeback address, a second input receiving said output of said bit-wise AND gate, and an output connecting to said cache memory.

31. The microprocessor of claim 30, wherein:
said inverse address translator wherein said first predetermined address range and said translate address register are fixed upon manufacture of said microprocessor.

32. The microprocessor of claim 30, wherein:
said inverse address translator includes
- a high range register for storing an upper address boundary of said first predetermined address range, said high range register writable during operation of the microprocessor,
- a low range register for storing a lower address boundary of said first predetermined address range, said low range register writable during operation of the microprocessor, and
- said translate address register is writable during operation of the microprocessor.

33. The microprocessor of claim 20, wherein:
said inverse address translator includes
- an inverse address range comparator for comparing said cache line writeback address with said first predetermined address range outside a range of addresses including the external memory and generating a match signal indicating whether said cache line writeback address is within said first predetermined address range,
- an AND gate having a first input receiving said system management mode input signal, a second input receiving said match signal and an output,
- a translate address register having a predetermined set of address bits stored therein,
- a bit-wise AND gate having a first input receiving at each bit said output of said AND gate, a second input receiving said translate address register and an output
- a bit-wise exclusive OR gate having a first input receiving said cache line writeback address, a second input receiving said output of said bit-wise AND gate, and an output connecting to said cache memory.

34. The microprocessor of claim 33, wherein:
said inverse address translator wherein said first predetermined address range and said translate address register are fixed upon manufacture of said microprocessor.

35. The microprocessor of claim 33, wherein:
said inverse address translator includes
- a high range register for storing an upper address boundary of said first predetermined address range, said high range register writable during operation of the microprocessor,
- a low range register for storing a lower address boundary of said first predetermined address range, said low range register writable during operation of the microprocessor, and
- said translate address register is writable during operation of the microprocessor.

36. The microprocessor of claim 1, further comprising:
- a load/store unit for generating a selected one of either a load address of data to be read from the external memory or a store address of data to be written to the external memory;
- a data cache memory connected to said load/store unit, said data cache memory for storing data therein with address tags corresponding to addresses received from said load/store unit, said data cache memory flushed upon each entry into said system management mode and upon each exit from said system management mode;
- a secondary address translator receiving data cache line writeback addresses from said data cache memory for supply to said cache memory, said secondary address translator (1) passing said data cache line writeback address unchanged if said system management mode input signal indicates said normal mode, and (2) translating said data cache line address to said first predetermined address range outside a range of addresses including the external memory if said system management mode input signal indicates said system management mode and said data cache line writeback address is within said second predetermined address range assigned to system management memory;

a secondary inverse address translator receiving a cache line fill address output from said data cache memory upon cache line fill, said inverse address translator (1) passing said cache line fill address unchanged if said cache line fill address is not within said first predetermined address range outside a range of addresses including the external memory, and (2) translating said cache line fill address to said second predetermined address range assigned to system management memory if said cache line fill address is within said first predetermined address range outside a range of addresses including the external memory; and said cache memory includes an inter-cache data port for bidirectional exchange of data with data cache memory, an input address port connected to receive addresses from said secondary address translator and an output address port for supplying addresses to said secondary inverse address translator.

37. The microprocessor of claim 1, further comprising:

an instruction fetch unit for generating an instruction fetch address of an instruction to be read from the external memory;

a code cache memory connected to said instruction fetch unit, said code cache memory for storing instructions therein with address tags corresponding to addresses received from said instruction fetch unit, said code cache memory flushed upon each entry into said system management mode and upon each exit from said system management mode;

a secondary inverse address translator receiving a cache line fill address output from said data cache memory upon cache line fill, said inverse address translator (1) passing said cache line fill address unchanged if said cache line fill address is not within said first predetermined address range outside a range of addresses including the external memory, and (2) translating said cache line fill address to said second predetermined address range assigned to system management memory if said cache line fill address is within said first predetermined address range outside a range of addresses including the external memory; and said cache memory includes an inter-cache code port for bidirectional exchange of data with said code cache memory and an output address port for supplying addresses to said secondary inverse address translator.

38. The microprocessor of claim 37, further comprising:

a secondary address translator receiving code cache line writeback addresses from said code cache memory for supply to said cache memory, said secondary address translator (1) passing said code cache line writeback address unchanged if said system management mode input signal indicates said normal mode, and (2) translating said code cache line address to said first predetermined address range outside a range of addresses including the external memory if said system management mode input signal indicates said system management mode and said code cache line writeback address is within said second predetermined address range assigned to system management memory; and said cache memory further includes an input address port connected to receive addresses from said secondary address translator.

39. The microprocessor of claim 1, further comprising:

a load/store unit for generating a selected one of either a load address of data to be read from the external memory or a store address of data to be written to the external memory;

a data table lookaside buffer and address translator connected to said mode input, receiving either said load address or said store address output by said load/store unit, said data table lookaside buffer and address translator
  (1) translating said load address or said store address received from said load/store unit from a virtual address to a physical address,
  (2) passing said load address or said store address received from said load/store unit unchanged if said system management mode input signal indicates said normal mode, and
  (3) translating said load address or said store address received from said load/store unit to said first predetermined address range outside a range of addresses including the external memory if said system management mode input signal indicates said system management mode and said load address or said store address is within said second predetermined address range assigned to system management memory; and said cache memory further includes a data access address input port receiving addresses from said data table lookaside buffer and address translator.

40. The microprocessor of claim 1, further comprising:

an instruction fetch unit for generating an instruction fetch address of data to be read from the external memory;

an instruction table lookaside buffer and address translator connected to said mode input, receiving said instruction fetch address output by said instruction fetch unit, said instruction table lookaside buffer and address translator
  (1) translating said instruction fetch address received from said instruction fetch unit from a virtual address to a physical address,
  (2) passing said instruction fetch address received from said instruction fetch unit unchanged if said system management mode input signal indicates said normal mode, and
  (3) translating said instruction fetch address received from said instruction fetch unit to said first predetermined address range outside a range of addresses including the external memory if said system management mode input signal indicates said system management mode and said instruction fetch address is within said second predetermined address range assigned to system management memory; and said cache memory further includes an instruction access address input port receiving addresses from said instruction table lookaside buffer and address translator.

41. A method of caching data in a computer system having a normal mode and a system management mode, said method comprising the steps of:

passing a received address unchanged if in the normal mode; and translating a received address to a first predetermined address range outside a range of addresses including an external memory if in the system management mode and said received address is within a second predetermined address range assigned to system management memory; and caching received data in a cache memory with address tags corresponding said unchanged address or said translated address.

42. The method of claim 41, wherein:

said second predetermined address range is fixed upon manufacture of the computer system.

43. The method of claim 41, wherein:

said second predetermined address range is alterable following manufacture of the computer system.

44. The method of claim 41, further comprising the steps of:

passing a cache line writeback address unchanged if said cache line writeback address is not within said first predetermined address range outside a range of addresses including the external memory;

translating said cache line writeback address to said second predetermined address range assigned to system management memory if said cache line writeback address is within said first predetermined address range outside a range of addresses including external memory;

signaling a system management mode when said cache line writeback address is within said first predetermined address range outside a range of addresses including the external memory; and signalling a normal mode when said cache line writeback address is not within said first predetermined address range outside a range od addresses including the external memory.

45. The method of claim 44, wherein:

said first predetermined address range outside a range of addresses including the external memory is fixed upon manufacture of the computer system.

46. The method of claim 44, wherein:

said first predetermined address range outside a range of addresses including the external memory is alterable following manufacture of the computer system.

* * * * *

UNITED STATES PATENT AND TRADEMARK OFFICE
CERTIFICATE OF CORRECTION

PATENT NO: 5,954,812

DATED: 9/21/99

INVENTOR(S): Jonathan H. Shiell, Patrick W. Bosshart

It is certified that error appears in the above-identified patent and that said Letters Patent are hereby corrected as shown below:

Cover Page, insert Item [60] under Related U.S. Application Data

--Provisional Application No. 60/029,383 October 29, 1996.--

Signed and Sealed this

Twenty-ninth Day of May, 2001

Attest:

NICHOLAS P. GODICI

Attesting Officer

Acting Director of the United States Patent and Trademark Office